Figure 1:
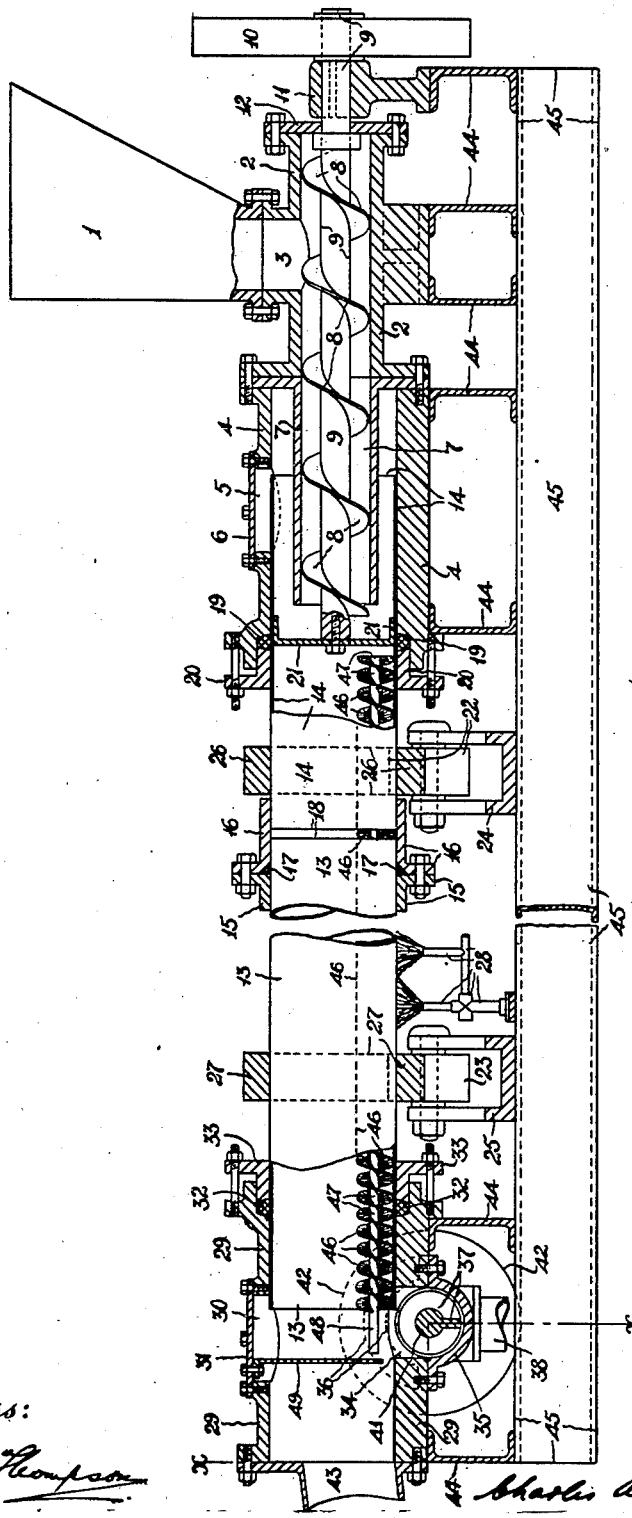

Feb. 23, 1926. 1,573,824
C. A. GRIFFITHS
APPARATUS FOR DISTILLING CARBONACEOUS MATERIALS
Filed May 31, 1924 2 Sheets-Sheet 2
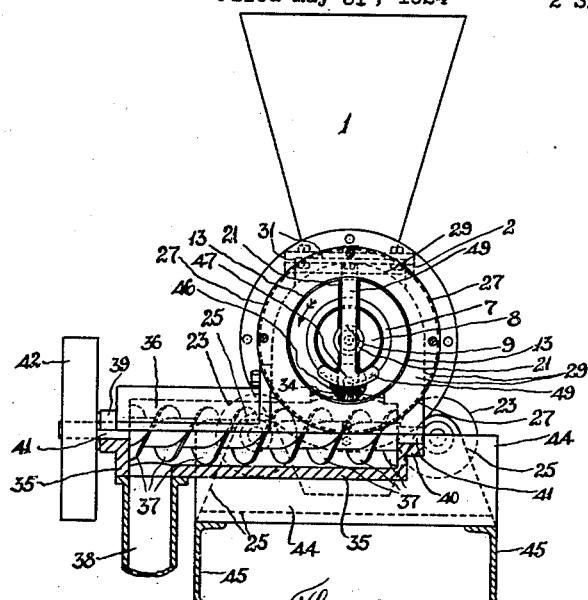
Fig. 2.
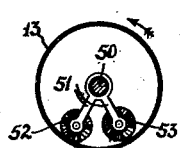 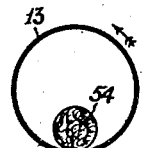 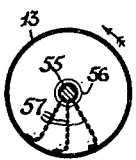 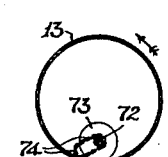
Fig. 3. Fig. 4. Fig. 5. Fig. 12.
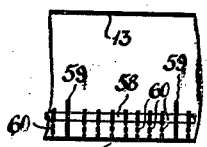 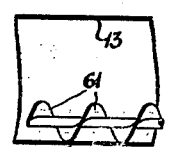 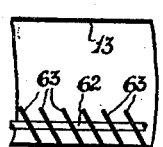 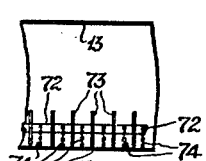
Fig. 6. Fig. 7. Fig. 8. Fig. 13.
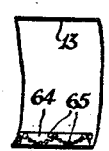 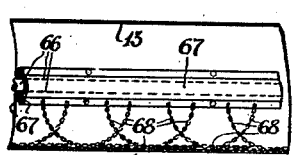 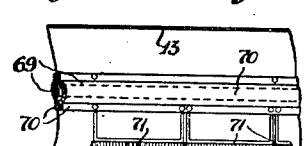
Fig. 9. Fig. 10. Fig. 11.
Witness:
Arthur Thompson
Inventor:
Charles Albert Griffiths Patented Feb. 23, 1926.

1,573,824

UNITED STATES PATENT OFFICE.

CHARLES ALBERT GRIFFITHS, OF JOHANNESBURG, TRANSVAAL, SOUTH AFRICA.

APPARATUS FOR DISTILLING CARBONACEOUS MATERIALS.

Application filed May 31, 1924. Serial No. 717,169.

*To all whom it may concern:*

Be it known that I, CHARLES ALBERT GRIFFITHS, a subject of the King of Great Britain, and resident of Johannesburg, Transvaal Province, Union of South Africa, have invented certain new and useful Improvements in Apparatus for Distilling Carbonaceous Materials, of which the following is a specification.

This invention relates to apparatus for distilling carbonaceous material and is especially applicable for the extraction of oils, paraffins, motor spirit, pitch, bitumen, sulphate of ammonia and other products from oil shales, torbanites, boghead minerals, pyropissits, cannel coals, bituminous and other coals, woods, shavings, sawdust and other carbonaceous materials and minerals, and it can be adapted for distilling carbonaceous liquids.

The object of the invention is to design an apparatus or retort affording a large amount of heat-radiating surface, for example in the form of a long thin rotating tube of comparatively small diameter, in combination with means operating within said rotating tubular retort for cleaning the retort or preventing the material under treatment from adhering to the wall of the retort and retarding the conduction and radiation of the heat to the material under treatment in the retort.

In constructing the improved apparatus or retort I employ a tubular, hollow cylindrical or other appropriately shaped retort, of suitable small diameter (say from three to twelve inches) and suitable length, which is revolvably mounted in bearings provided by two stationary casings or castings fitted with air-tight packings or glands around the retort, one being disposed in proximity to each end thereof. The tubular retort which is made as thin as possible, may be made of mild steel, iron, stainless steel, copper, brass, bronze or other suitable alloy, metal or material possessing the requisite properties or qualities of high heat conductivity, strength, durability and infusibility under the necessary heat to which the retort must be subjected when in operation.

The stationary casing or casting at one end of the retort is used as the inlet for the material to be treated, and that at the other end as the outlet for discharging the non-volatile residues and volatile products. Connected to the stationary casing at the inlet end is a feed casing, which may comprise two sections in which is operatively arranged a screw conveyor for introducing the material directly into the retort, the one section receiving the material to be treated from a hopper discharging directly into it, and the other section extending for a suitable distance into the stationary casing and retort. The material in the hopper and conveyor casing prevents the ingress of air into the retort and the egress of volatile products therefrom. The material to be introduced into the retort may be finely ground or otherwise suitably reduced, or be of any suitable size or grade found suitable for the nature of the various materials to be treated.

The stationary casing at the discharge end is fitted with a screw conveyor for discharging the non-volatile residues which pass out of the discharge end of the retort. It is also fitted with a discharge outlet through which the distillate or oil vapours and other gases produced may pass or be conducted to the condensing means. The removal of the distillate may be assisted by providing an exhaust fan communicating with the outlet for the distillate or oil vapours and other gases.

The retort is carried at suitable intervals along its length by supporting rollers, or other convenient means. It is rotated at a suitable speed by any convenient means such as a belt drive, cog wheels, a chain drive or other gearing. The driving of the retort is preferably effected by connecting the feed screw conveyor shaft or centre with the inside of the retort. Alternatively it may be driven by means of a separate shaft passing through the stationary casing into the discharge end of the retort and connected with the inside of the retort at the discharge end, or by a shaft passing through both stationary casings and extending through the retort from end to end and connected thereto, to which shaft the feed screw could be attached.

The retort, at or in proximity to either or both ends, may be fitted with flanged sleeves and the joints be made air-tight. This construction will allow the retort to be removed at will and replaced, or another substituted therefor with little loss of time.

The retort, along its length and also, if desired, around it, is externally heated by suitable means, such as electrical elements, or hot furnace gases, or gas applied at suitable points and preferably through suitable burners. The heating means or burners may be so arranged that the heating medium or gas supply for a row of them may be turned off simultaneously, or every alternate burner, et cetera, or each individual burner, et cetera, turned off separately, in order to obtain the desired control of the heat supplied. The burners, et cetera, can be so arranged that the whole or only one or more longitudinal portions or segments of the retort may at will be directly subjected to heating by the gas jets or heating medium at one time and/or that the whole or only one or more transverse portions or cross-sections of the retort may be directly subjected to heating by the gas jets or heating medium at one time. The burners, et cetera, may be so arranged that they can be adjusted relative to the retort or brought nearer to or removed further from the retort, at will. These arrangements will ensure effective control of, or regulate, the heating, and give inside the retort and to the material under treatment therein intermittent comparatively cool zones or spaces and intervals to which the heat will be transmitted by conduction and radiation.

The retort can be enclosed, either wholly or in part, with fire-brick or other suitable heat non-conducting material so that the heat may be conserved.

In the retort there may be placed a metallic brush or brushes, or sets or groups of brushes which may be arranged loosely within the retort or fixed stationary therein so that the metallic bristles thereof will touch or have contact with the interior of the retort and so act as a scraper and cleaner. Alternatively, some or all of the brushes may be made to revolve, as for example by a shaft carried through the stationary casings at each end and driven by suitable gearing. In the arrangement of loose brushes they will be placed so as to ride or be carried loosely inside the retort, so that as the retort revolves the brush or brushes will be caused to revolve independently and thereby keep the interior wall of the retort clean.

The brush including the bristles may be made of any suitable metals, alloys or materials, for instance, some of the bristles in any one or more of the brushes may be of steel and others of copper or other suitable metals or alloys which are good conductors of heat. The brush or brushes may also be provided or fitted in suitable numbers with longitudinal wires or strands made of copper or other metal or material, preferably of a conductive metal or alloy, extending through between the metallic bristles. The bristles may be of any suitable length or lengths and may be placed on or around the brush uniformly or otherwise in any required lengths and numbers and densities, and/or they may be placed in bunches or groups, and be spirally or otherwise arranged so as to tend to move the raw material fed into the retort either against the direction of flow, if the retort be arranged so that it is inclined downwards towards the discharge end, or with the direction of flow of the material if the retort be arranged with its axis horizontal or inclined upwardly in the direction of its discharge end, and/or in such positions, groupings or spirals, of the same pitch or different pitches, as may be found suitable and necessary to effect, further, or assist in moving the material from either end of the retort to the other end, and/or so that part or parts of the length of the brush or brushes will tend to move the material in one direction and at the same time other parts will tend to move the material in the other direction. The brush with its bristles may either be circular, square, oval or of any other suitable shape in cross section.

The brush or brushes operate, when the apparatus is in operation, to keep the internal wall of the retort clean, to move and mix the material being treated so that it is never allowed to rest for any appreciable or undue length of time on the heated interior surface of the retort, and to assist and regulate the passage of the material through the retort, the time of passage and, therefore, the time of treatment of the material passing through.

Owing to the body or stem of the brush or brushes and the bristles and strands of the brush or brushes being made of metal, alloy or material preferably of a highly conductive nature, and owing to the bristles, or bristles and strands, or some of them being in constant contact with the hot walls of the retort, the brush or brushes act as conductors of the heat from the hot internal surface or walls of the retort and convey and distribute the heat to and among the individual particles of the material being treated. For this reason the brush or brushes and its or their bristles, and its or their strands of wire are preferably made of the best conducting metals, alloys or material.

If found necessary or desirable, arrangements may be provided to introduce either water, saturated steam, or dry steam, or superheated steam into the retort at one or either or both ends, for example, by means of one or more pipes extending through the stationary casings at each end of the retort, and/or any other suitable gas, which may or may not be specially heated, which may be found to be of advantage or to assist the process of extraction of the oil or other products from the material which is to be treated, and/or of converting the oil, et cetera, vapours into such saturated and/or unsaturated hydrocarbons as may be chiefly required.

If desired, granular material such as sand or silica or suitable metal or metals, the individual grains or particles being either round or angular or irregular in shape, can be introduced into the feed end of the retort, either cool, to assist or regulate the passage of the material through the retort, or suitably heated, to assist in heating the material, and thereby promote the distillation of its hydrocarbons and other valuable constituents.

Instead of a metallic brush or brushes substitutes therefor may be employed constructed in the form of a tangle or other structure or structures made of wire and/or wire netting, either with or without metallic bristles or their equivalent, or in place of the metallic brush or brushes there may be used a metallic spiral or spirals, or metallic rods with metallic discs placed thereon, either at right angles to the axis of the rod or inclined thereto.

Alternately, a metal rod or rods or wire rope or ropes partially unravelled, or wire rope stem or stems, either by themselves or carrying a chain or chains longitudinally attached thereto may be used instead of the simple brush or brushes or the alternatives hereinbefore mentioned. To the chain or chains there may be attached metallic bristles; or alternatively to the metal rod or rods or wire rope stem or stems short chains may be attached from point to point along the rods or stems, and these short chains may also have metallic bristles attached thereto; or metallic rings, and/or rings of metallic chain may be placed loosely or attached encircling the rod or rods or the wire rope stem or stems at suitable intervals either along the full length of these, or alternatively, they may be placed at intervals between lengths of metallic brush or brushes or other of the alternatives therefor; or a shaft or rod may be carried by and through the retort and a loose sleeve or sleeves or collars may be arranged thereon and serve to carry, either directly or indirectly, chains or brushes or revolving brushes. As a further alternative for the brushes I may employ one or more chains placed longitudinally inside the retort and attached by one or both ends and/or any intermediate point or points to the driving shaft or shafts inside the retort.

The complete apparatus may include a plurality of the rotatable tubular or hollow cylindrical retorts with one common stationary casing or casting at each end designed to serve all the retorts; each of the retorts being fitted with air-tight glands, feed screw conveyor, discharge screw conveyor, and the other fittings and accessories hereinbefore referred to.

In the accompanying drawings I illustrate a practical embodiment of the invention, wherein, Fig. 1 represents the entire apparatus in part-sectional elevation.

Fig. 2 is a sectional elevation taken on line x—x of Fig. 1, looking towards the feed end of the retort.

Figs. 3 to 11 are views illustrating various modifications in the construction of the arrangement employed in the retort for preventing the material under treatment adhering to the wall thereof, and Figs' 12 and 13 are two sectional views of the retort, at right angles to each other, illustrating a further form of the arrangement for preventing the material under treatment adhering to the wall of the retort.

In Figs. 1 and 2 of the drawings the numeral 1 denotes the feed hopper for receiving the finely ground or comminuted material which is to be treated. 2 represents the one section of the conveyor casing on the top of which and above the inlet 3 there is fitted the hopper 1. 4 is the stationary casing at the inlet end of the retort, which casing 4 is bolted to the section 2 and is provided with an inspection opening 5 fitted with a detachable cover 6.

7 is the inner section of the conveyor casing which is fixed to the section 2 by securing it between said section 2 and the stationary casing 4. 8 is the screw conveyor, on the shaft or centre 9 of which is fixed the driving pulley 10; 11 being the bearing for the outer end of the shaft or centre 9, and 12 a plate for closing the end of section 2 of the conveyor casing around the shaft 9.

13 is the tubular or hollow cylindrical retort, which, as previously explained, is preferably of a diameter between three and twelve inches, is made of thin material, and is of a sufficient length to ensure, under working conditions, that treatment of the material shall be completed in its passage therethrough. The one end of the retort 13 is attached to a relatively short extension of the same diameter and thickness as the retort 13, by providing near the one end of the retort 13 a flange 15, and providing an overlapping flanged sleeve 16 at the end of the extension 14; 17 being packing between the flanges and the retort 13. This construction places the joint 18 between the extension 14 and the retort 13 at some distance inside the flanged sleeve 16, and so strengthens the joint and precludes the egress of volatile products from the retort through the joint, and also rigidly connects the extension 14 to the retort 13. The extension 14 projects into the casing 4 and the casing is constructed to form a stuffing box 19 and gland 20 for making an air-tight joint around said extension 14.

The inner end of the conveyor screw shaft or centre 9 is attached through the medium of the cross-piece 21 to the extension 14, so that, when the screw conveyor 8 is rotated by the driving belt on pulley 10, the screw rotates the retort 13 through the extension 14 and connection 15, 16.

22, 23 are rollers carried by suitable brackets 24, 25, below the retort 13, and 26, 27, are rings fixed around the retort 13, and running in contact with the rollers 22, 23, and so serving rotatably to support the retort 13. Obviously, any desired number of such rollers may be provided to suit the length of the retort 13.

28 represents certain portions of the pipes and connections for leading the heating medium and directing it centrally under the retort 13 for heating the same along the length thereof.

29 is the casing at the discharge end of the retort, into which for a suitable distance the discharge end of the retort 13 projects, so that the solid residue, as it leaves the retort, falls into the discharge means, hereinafter referred to. The casing 29 is constructed with an inspection opening 30 fitted with a cover 31, and is also constructed to form a stuffing box 32 having a gland 33 to make a gas-tight joint around the retort 13. The casing 29 is fashioned in its lower portion to form a transverse discharge opening 34 beneath which is fixed a trough-shaped part or casting 35, which, with the casing 29 and a cover 36, forms the housing for the screw conveyor 37 for discharging the non-volatile residues from the apparatus through a pipe 38. The parts forming the housing for the conveyor screw 37 are constructed to form bearings 39, 40 for the screw shaft or centre piece 41, and 42 is a pulley fixed on the outer end of said shaft 41 for driving the screw conveyor 37.

43 is a pipe fixed on the outer end of the casing 29 for forming the outlet for the volatile products from the retort. This pipe 43 is shown inclined in a downward direction, so that any liquid condensing out of the distillate flows down said pipe 43 away from the retort.

44, 45, are girders forming a supporting framework for the various parts of the apparatus.

In Figs. 1 and 2, I illustrate the device which is arranged within the retort 13 and operates to keep the wall of the retort 13 clean or free from adhering matter and for assisting in the distribution of the heat throughout the mass of the material under treatment in the retort, as comprising a helical brush 46, the bristles of which are made of wire and suitably fixed around a centre piece or core 47. This spiral brush, as shown in the drawings, rests loosely on the bottom of the retort 13. To prevent the brush from working out of the retort longitudinally in the direction of the discharge end, the centre piece 47 is extended for a short distance, as indicated at 48, and a stop 49 is fixed to the cover 31 for the opening 30; the stop 49 being shaped at its lower end to ensure its engagement by the extension 48 in all possible working positions of the brush 46.

In Figs. 1 and 2 the retort is shown arranged horizontally. In this construction the spiral brush 46 will operate to advance the material through the retort from the inlet to the outlet.

In the various modified forms of the arrangement for cleaning the wall of the retort 13 and for assisting in distributing the heat through the mass of the material under treatment, that shown in Fig. 3 represents a construction in which is employed a central rod or shaft 50 attached in any convenient manner to the retort 13 or the driving arrangement therefor, from which shaft there are loosely suspended two or more carriers 51 for two revolving wire brushes 52, 53, both of which freely rotate in contact with the internal wall of the retort 13.

In Fig. 4 a tangle or mass of entangled wire or the like 54 is provided fashioned into cylindrical or similar formation, extending from end to end of the retort 13, and loosely lying inside the retort.

In Fig. 5 is a central shaft 55, attached to the retort 13 or the driving means therefor, has arranged around it a tube 56 from which is suspended a suitable number of chains 57, the end of which are in contact with the wall of the retort 13.

In Fig. 6 the arrangement comprises a loose rod 58 extending longitudinally and supported by discs or rings 59 fixed thereon, with short lengths of chain 60 attached to the rod 58, at a suitable distance apart between the discs 59.

In Fig. 7 a small screw conveyor 61 is loosely arranged in the bottom of the retort 13.

In Fig. 8 a rod 62, with discs 63 arranged at an angle to the axis of the rod 62, is shown placed loosely in the bottom of the retort 13.

In Fig. 9 a rod 64, which is arranged loosely in the bottom of the retort 13, has attached to it, at points along its length, a looped chain or chains 65.

In Fig. 10 a central rod 66 is employed attached to the retort or its driving means on which rod there is loosely arranged a two-part sleeve 67, from which are suspended in overlapping formation a plurality of chains 68.

In Fig. 11 the central rod or shaft 69, which is attached to the retort or its driving means, has loosely arranged upon it the two-part sleeve 70 from which there are hung a plurality of metallic wire brushes 71 running parallel to the axis of the retort, and in Figs. 12 and 13 a loose rod 72 is arranged in the bottom of the retorts 13, which rod is supported by discs 73, with looped or continuous chains 74 placed around the rod 72 intermediate the discs 73.

What I claim as my invention and desire to protect by Letters Patent is:—

1. Apparatus for distilling carbonaceous materials, including a revolvable tubular retort of small diameter, having a thin wall to which the heat is applied externally, means for heating the retort, and a freely rolling metallic brush arranged inside the retort and unconnected with the retort, and rotated only by frictional contact with the walls thereof, and of a diameter considerably less than the internal diameter of the retort, for cleaning the internal wall thereof and for distributing the heat throughout the mass of the material under treatment, as set forth.

2. Apparatus for distilling carbonaceous materials, including a revolvable tubular retort of small diameter, having a thin wall to which the heat is applied externally, means for heating the retort, a freely rolling metallic brush arranged inside the retort and unconnected with the retort, and rotated by frictional contact with the walls thereof, and of a diameter considerably less than the internal diameter of the retort, for cleaning the internal wall thereof and for distributing the heat throughout the mass of the material under treatment, and a stationary stop shaped to ensure its engagement by the one end of the brush in all working positions of the latter, as set forth.

In testimony whereof I have signed my name to this specification.

CHARLES ALBERT GRIFFITHS.